United States Patent [19]

Hafla et al.

[11] Patent Number: 4,463,635
[45] Date of Patent: Aug. 7, 1984

[54] STEADY FOR HOLDING ROD-LIKE CIRCULAR CROSS-SECTION COMPONENTS

[75] Inventors: Dietmar Hafla, Hohengehren; Herbert Illi, Ostfildern, both of Fed. Rep. of Germany

[73] Assignee: Index-Werke Komm.-Ges. Hahn & Tessky, Esslingen, Fed. Rep. of Germany

[21] Appl. No.: 325,602

[22] Filed: Nov. 27, 1981

[30] Foreign Application Priority Data

Dec. 18, 1980 [GB] United Kingdom ............... 8040589

[51] Int. Cl.³ .............................................. B23B 25/00
[52] U.S. Cl. ........................................ 82/38 R; 82/39
[58] Field of Search ............... 82/38 R, 39; 51/238 R, 51/238 S

[56] References Cited

U.S. PATENT DOCUMENTS

| 898,589 | 9/1908 | Meyers | 51/238 S |
|---|---|---|---|
| 2,459,068 | 1/1949 | Eastwood | 82/39 |
| 2,547,529 | 4/1951 | Lichtenberg | 51/238 S |
| 2,612,809 | 10/1952 | Shager | 82/39 |
| 3,320,839 | 5/1967 | Dinsmore | 82/39 |
| 3,535,963 | 10/1970 | Dietl | 82/38 R |

Primary Examiner—Leonidas Vlachos
Assistant Examiner—Jerry Kearns
Attorney, Agent, or Firm—Shenier & O'Connor

[57] ABSTRACT

A steady for holding rod-shaped components 40 of circular cross-section, with three holding-members in a common plane, one holding-member 16 being linearly movable and the other two being pivoted twin arm-levers 12, 14 and arranged to be operated as the holding member 16 is moved linearly, the distances of the members 12, 14 16 from the component center being maintained substantially equal and the drive connection between the linearly movable holding member 16 and the pivoting holding members 12, 14 being through eccentrics 48, 50 automatically rotatable for pivoting the holding members 12, 14 by an adjuster means 52.

6 Claims, 6 Drawing Figures

STEADY FOR HOLDING ROD-LIKE CIRCULAR CROSS-SECTION COMPONENTS

Reference is made to applicants' copending application Ser. No. 325,570, filed Nov. 27, 1981, now abandoned.

The invention relates to a steady for holding rod-shaped components of circular cross-section, with three holding members arranged on a common plane, of which a first is linearly movable in the direction of the component axis, and the other two are designed as twin-arm levers located on either side of the first holding member with fixed pivot shafts parallel to the component axis and acting in conjunction with the first holding-member by means of one lever-arm and pivoting after linear displacement, in such a manner that in any position of the first holding-member, the three holding-members remain essentially at the same distance from the axis of the component.

Steadies of the aforegoing type are used for instance on lathes for central support and guiding of longer types of shaft-like component clamped in position and rotating, where they may be used as required as additional accessories mounted on the machine frame.

A disadvantage of such steadies is that any variation in clamping force results in elastic distortion of the holding-members, thus causing a displacement of the location centre. The clamping force is thereby determined by the working pressure with which the linearly movable holding-member is adjusted.

In order to ensure extensive compensation of geometry- and distortion-errors in a known form of steady, the linearly movable holding-member has a cam on each pivoting holding-member, the lever arm of the pivoting holding-member bearing against the cam with a cam-roller. The cams are precision made according to a calculation, and are therefore commensurately expensive.

As a result of the use of such cams, the production of a new steady with a different clamping-range is most expensive, since the cams can only be designed for a single clamping range. Reference is made to a leaflet "SMW clamping arrangements", by Schneider and Weisshaupt GmbH + Co. No. EM 877).

The object of the invention is to provide a steady of the foregoing type in such a way, that geometry- as well as elastic-distortion-errors in the centre location variations of the pivoting holding-members are at least automatically compensated to such an extent that any possible residual inaccuracies remain negligibly small.

According to the invention there is provided a steady for holding rod-shaped components of circular cross-section, with three holding members arranged on a common plane, of which a first is movable linearly in the direction of the component axis, and the other two are designed as twin-arm levers and arranged with fixed pivot-shafts parallel to the component on opposing sides of the first holding-member and operating in conjunction with their one lever-arm together with the first holding-member and pivot when this is moved linearly, in such a manner that in any position of the first holding-member the three holding-members are at essentially the same distance from the machined component centre-line, wherein in the drive connection of the pivoting holding-members with the linearly movable holding-member, an eccentric is arranged to rotate said eccentric being located on either of the lever-arms of the pivoting holding-members or on the linearly movable holding-member, the said eccentric being automatically rotatable for pivoting adjustment of the pivoting holding-members by means of an adjuster means according to the movement.

Displacement of the linearly movable holding-member in relation to both pivoting holding-members thus results in a corresponding rotation of the eccentric, by means of which an additional correcting pivoting movement of the pivoting holding-members is ensured to compensate the centre mis-location.

The arrangement allows the drive connection between the linearly movable holding-member and the pivoting holding-members to be arranged in different ways.

In one form, the eccentrics of the adjuster system each have a control-lever, on the one hand forming a non-rotating fixture on the eccentric and on the other hand allowing pivoting as well as longitudinal adjustment at an anchor point on the linearly movable holding-member or on a carrier bearing the holding-members, whereby on adjustment of the linearly movable holding-member, the anchor-point and the eccentric are moved relatively to each other.

Where the eccentric is located on a lever-arm of the pivoting holding-member, a particularly advantageous design is achieved, by extending the pivoting holding-members, and when a roller is located on their eccentric, so as to bear against a cam-surface forming the drive-arrangement of the linearly movable holding-member, the cam-surface being located at a sharp angle to the longitudinal axis of the linearly movable holding-member.

This design allows the use of flat cam-surfaces, which do not require highly complicated calculations to produce.

A further advantageous arrangement allows the fitting of cam-surfaces to control the pivoting holding-members to be dispensed with. It is preferably characterized in that, the lever arms of each of both pivoting holding-members form an obtuse angle together, the lever-arm of the first holding-member extending away from the component, its one end being articulated with a guide-rod of which the other end is fitted to the linearly movable holding-member, so that one of the bearing points of the guide-rod forms the adjuster means by way of a rotating eccentric.

Tests have shown that such a design of the pivoting holding-members, taking into account a corresponding angle-size as well as a suitable lever-ratio, of which the parameters are determined by calculation, provide optimum pre-conditions for ensuring the holding-members track movement control, so that the centre location variation is reduced over the whole of the clamping range.

In another convenient and advantageous form, the pivoting holding-members form an obtuse angle according to the foregoing arrangements, and whereby the guide-rods are each connected to an eccentric on the linearly movable holding-member, a non-rotating pinion being provided on one bearing stub of the eccentric, the said pinion engaging with a rack which is fixed to the carrier.

The invention will now be described by way of example with reference to the accompanying drawings in which.

Figure 1:
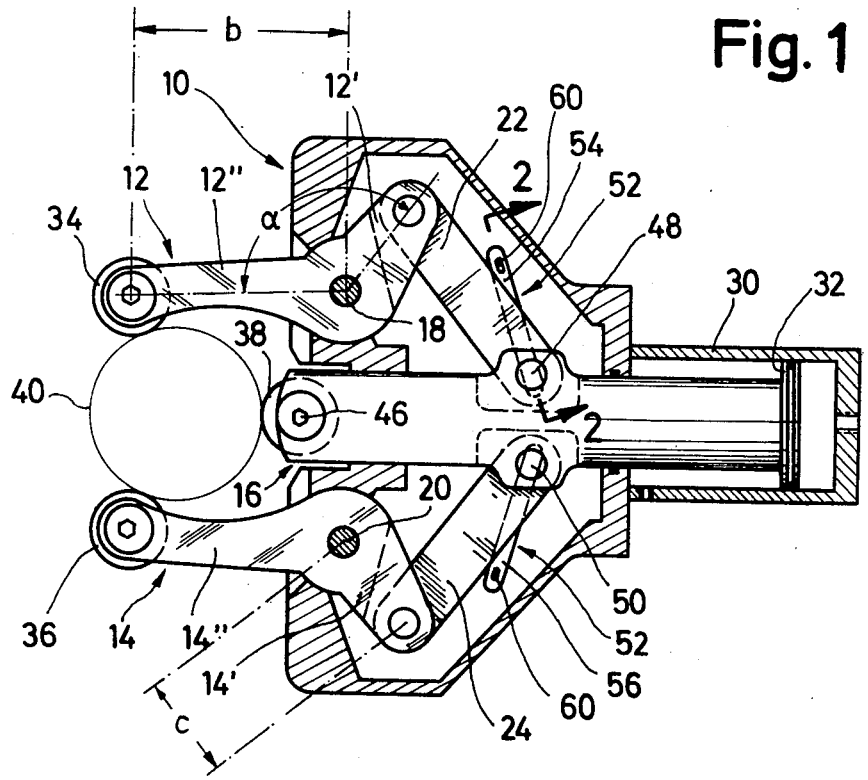
FIG. 1 is a longitudinal section through a first form of a steady constructed in accordance with the invention.

FIG. 1 shows a steady housing 10, in which three adjustable holding-members 12, 14, 16 are arranged. They are on a common plane and are located at a distance from each other. Holding-member 16 forms a linearly movable rod-like slide at the centre of the housing, whereas the other two holding-members 12, 14 form dual-arm levers pivoting about pivot-shafts 18, 20 on a common plane. The lever-arms 12' or 14' located within the housing are connected by a guide-rod 22 or 24 with the holding-member 16 forming a slide with a pivoting movement, for which purposes the guide-rods are located within eccentric studs 48 or 50 opposite each other in holding-member 16. The holding-member 16 itself is adjustable axially by means of a double-acting piston 32 guided within a cylinder 30 and located at the rear end of the member. The pivoting holding-members have and their lever arms 12" and 14" projecting from the steady housing. The holding-member 16 also projects at the front from the steady housing 10. At the front end of this part of the holding-members a roller 34, 36, 38 is secured so as revolve on a parallel axis to each of pivot-shafts 18, 20.

The opposing location of the rollers is arranged in such a way, that they bear against the periphery of a circular component 40 at an angular distance of 120° approximately, for instance so as to retain the said component 40 in a lathe with its longitudinal axis coaxial with the working spindle. During rotation of the component 40, the rollers 34, 36, 38 rotate against the component periphery, so that piston 32 is permanently pressurised by a pressure medium.

The rollers are located between two fork-arms of lever-arms 12", 14" preferably on an eccentric stud 42, which is arranged so as to lock or rotate within the fork-arms, though this is not shown here. When the eccentric studs are released, they can be adjusted preferably with a spanner, so that rollers 34, 36, 38 may be adjusted in relation to the holding-members, to ensure their radial displacement in relation to the machined component. In this way fine adjustment of the location centre is obtained.

In the form shown, the acutation of the pivoting holding-members 12, 14 is achieved by means of guide-rods 22, 24, each articulated from a revolving eccentric stud 48 or 50 on the linearly movable holding-member 16. Rotation of the eccentric stud 48, 50 allows the compensation of centre location variations arising our of elastic distortion of the pivoting holding-members 12, 14.

Figure 2:
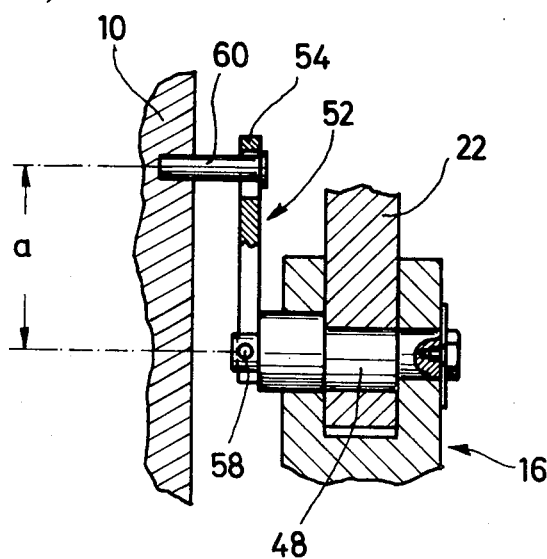
FIG. 2 is a part section along line 2—2 of FIG. 1 on a larger scale than FIG. 1.

In the present example, this rotation of the eccentric stud by means of an arrangement which is defined overall as an adjuster 52, is executed automatically during the linear adjustment of the holding-member 16 or the pivoting of the other two holding-members 12, 14, in that each eccentric stud has control-lever 54 or 56. This may be seen as in FIG. 2, from the relevant eccentric studs, 48, 50 immobilised against rotation for instance by means of a pin 58, whereas the other end is secured for instance to a fixed, stud-like anchor-member 60 which can be pivoted as well as longitudinally adjusted to choice. The distance 'a' between the centres of the eccentric stud and the anchor-member 60 is selected in such a manner that on complete adjustment of holding-members, actuated by the linear-movement of holding member 16 the eccentric studs 48, 50 are rotated by such an angle, that any error present in the track of the rollers 34, 36 on the lever-arms 12", 14" of the holding-members 12, 14 is compensated in relation to the component axis of rotation, and the rollers 34, 36, 38 are all brought closer to the axis of the working spindle i.e. to the relative centre of the component to be adjusted, and this is effected in an optimum manner.

In an alternative to the example shown in FIG. 1 the location of the eccentric studs 48, 50 with parallel adjustment to the longitudinal axis of rectilinear-movement holding-member 16, is so arranged to ensure a correcting-movement for holding-members 12, 14.

In such machining centre automatic self-adjusting steadies with pressure-medium actuated holding-member 16, the variation in turning location centre due to geometry errors and elastic distortion can be further minimised advantageously in that the lever-arm of the pivoting- movement holding-members within housing 10 is arranged in such a way, that its lever-arm 12', 14' working in conjunction with the linearly movable holding-member 16 extends away from the holding-member 16.

For this purpose, the choice of a corresponding angle as well as a lever-ratio of lever lengths 'b' and 'c' is decisive. Furthermore, the required approach movement by positioning of the pivot-shafts 18, 20 of the pivoting holding-members 12, 14 as well as the articulation-points of guide-rods 22, 24 on lever arms 12', 14' can be optimised.

Angling of the lever-arms 12', 14' to the holding-members 12, 14 in the direction of the linearly movable holding-member, as outlined in the device described in the "SMW Clamping Arrangements" leaflet, will on the other hand, lead to greater centre location variations owing to geometric considerations (function of a higher degree).

Figure 3:
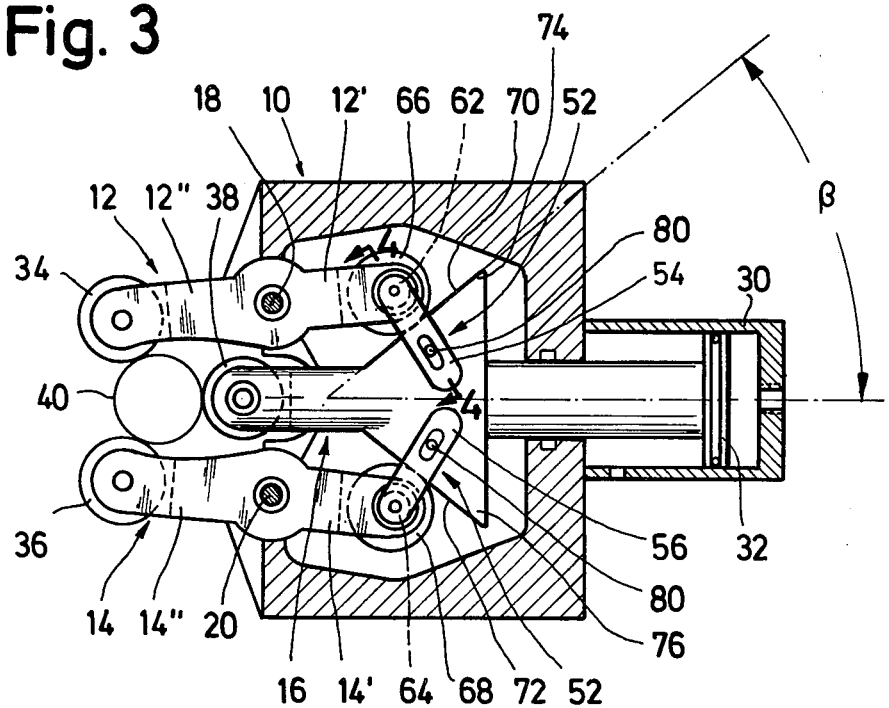
FIG. 3 is a longitudinal section of a second example of a steady.

In the example of a steady in FIG. 3m eccentric studs 62 and 64 are shown, ensuring the execution of the correction movement of the holding-members 12, 14 and the said studs are shown so that they rotate in the lever arms 12', 14' of the holding-members 12, 14. A revolving roller 66 or 68 as shown in FIG. 4 is shown on the holding-members between two fork shanks of the lever-arms 12', 14'.

These rollers operate in conjunction with a cam surface 70 or 72 of the linearly movable holding-member 16. The arrangement of the eccentric studs 62, 64 allows a straight line to be formed along the cam-surface, the said line being at an acute angle B to the movement plane of the holding-member 16. The cam-surfaces form for instance flat wedge surfaces. Conveniently they are formed on a taper part-component on the holding-member 16.

The part sections of this holding-member with the wedge surfaces are shown at 74 and 76. They have at least one flat side surface.

Figure 4:
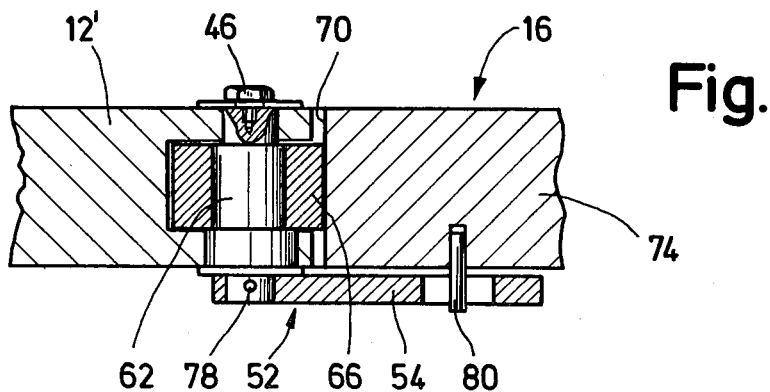
FIG. 4 is a part section along line 4—4 of FIG. 3.

An adjuster 52 for setting the eccentric studs 62, 64 is also provided in this steady, and similarly with the adjuster in FIG. 1 a control-lever 54 or 56 is provided for each eccentric stud, as may be seen in FIG. 4, locked against rotation on the eccentric stud by means of a pin 78 as well as retained so as to pivot as well as to adjust longitudinally by means for instance of a stud-like anchor-member 80 on one of the flat side faces of the wedge components 74, 76. In this way, similarly with FIG. 1 there is automatic adjustment of any variation in relation to the component centre.

The displacement of the eccentric studs 62, 64 into the lever-arms 12′, 14′ of the pivoting holding-member, thus allows a flat cam surface on the holding-member 16 instead of a cam which is complicated to calculate and expensive to manufacture.

In the design example shown here, both lever-arms 12′, 12″ or 14′, 14″ of the holding-members 12, 14 are extended longitudinally one behind the other. On the other hand, it is also possible in this case to provide for an arrangement analogous to that of the holding-members 12, 14 in FIG. 1.

It is clear that an arrangement is possible with three grippers.

Figure 5:
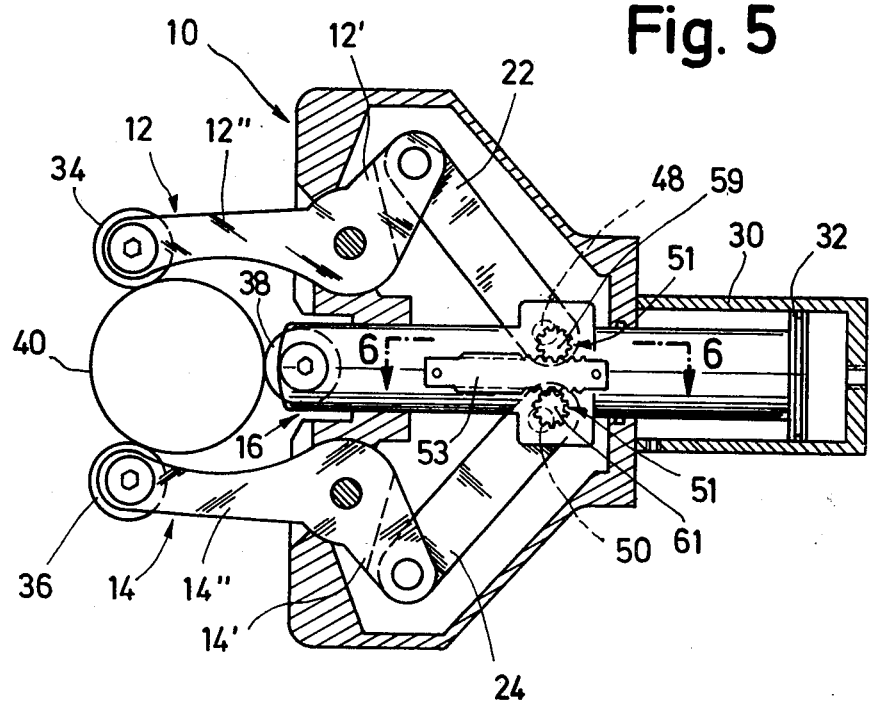
FIG. 5 is a longitudinal section through a third form of steady.
Figure 6:
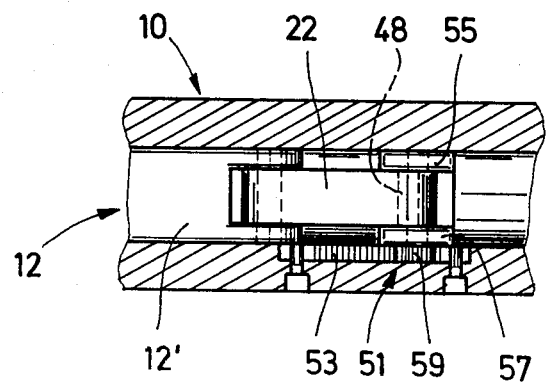
FIG. 6 is a part section along line 6—6 of FIG. 5, on a larger scale than FIG. 5.

FIGS. 5 and 6 show a design alternative for the adjuster system in the case of a steady in accordance with FIG. 1, and referenced under 51 as a complete assembly.

Its two holding-members 12, 14 designed as pivoting levers have a common rack 53 toothed on the longitudinal sides and secured to the steady housing 10. The eccentric studs 48, 50 with their eccentric in the guide-rods 22, 24 are located so as to rotate between bearing arms 55, 57 of the linearly movable holding-member 16 and carry at one stud-end a non-rotating pinion 59 or 61, engaging with the adjacent teeth of the rack 53.

In the axial adjustment of the holding-member 16 the pinions 59, 61 roll down the rack 53 and thereby rotate the eccentric studs 48, 50 so that extensive compensation of location centre variations of the steady is achieved.

The eccentricity as well as the starting point for the eccentric studs 48, 50 can be determined mathematically by an approximation solution, providing that the following parameters related to FIG. 1 are known, namely the lengths 'a' and 'b' of lever-arms 12′, 14′ and 12″, 14″ of the holding-members 12, 14; the position of pivoting shafts 18 and 20 of the holding-member 12, 14 in the steady housing and the centre-point of the eccentric studs 48 and 50.

Having thus described our invention

1. A steady for holding a rod-shaped component of circular cross-section including three holding-members acting in a common plane, means mounting a first one of said holding-members for linear movement toward the axis of a component to be held, the other two of said holding-members being twin-arm levers, means mounting said other two holding-members on opposite sides of said first holding-member for pivotal movement around fixed axes parallel to the axis of a component to be held, means for moving said first holding-member linearly, drive connections responsive to movement of said first holding-member for pivoting said other holding-members in such a manner that in any position of the first holding-member the three holding-members are at substantially the same distance from said component axis, each of said drive connections comprising a rotatable eccentric for adjusting the associated other holding-member by swivelling the same about its fixed pivot axis, and actuating means for rotating said eccentrics in accordance with the movement of one of the holding-members relative to the other holding-members.

2. A steady as in claim 1 in which the actuating means associated with each of said eccentrics comprises a control lever connected to the eccentric for rotation therewith, means providing an anchor point and means pivotally connecting the control lever to said anchor point while permitting motion of said control lever in the direction of its length relative to said anchor point, the arrangement being such that upon displacement of said first holding-member, said anchor point and said eccentric are displaced relative to each other.

3. A steady as in claim 1 or claim 2 wherein said other holding-members are straight levers, said eccentrics being mounted on lever arms of said other holding-members, said drive connections comprising respective cam faces on said first holding-member, each of said cam faces being located at an acute angle to the longitudinal axis of the first holding-member, and respective rollers on said eccentrics bearing against said cam faces.

4. A steady as in claim 1 or claim 2 wherein the lever arms of each of said other holding-members form an obtuse angle, said drive connections further comprising respective links, means pivotally connecting corresponding ends of said links respectively to the lever arms of said other holding-members remote from the component and means pivotally connecting the other ends of said links to said first holding-member, each of said eccentrics forming one pivot point of one of said links.

5. A steady as in claim 4 including a carrier supporting said holding-members, said eccentrics being carried by said first holding-member, said other link ends being mounted on said eccentrics, said actuating means comprising respective pinions on said eccentrics, and a rack on said carrier engaging said pinions.

6. A steady as in claim 1 including respective component engaging rollers carried by said holding-members and adjustable eccentrics respectively mounting said rollers for rotary movement on said members.

* * * * *